(12) United States Patent
Iizuka

(10) Patent No.: US 11,339,880 B2
(45) Date of Patent: May 24, 2022

(54) SET OF JIGS FOR ASSEMBLING A VALVE, AND A DIAPHRAGM VALVE ASSEMBLED WITH THE SAME

(71) Applicant: Kitz SCT Corporation, Tokyo (JP)

(72) Inventor: Hisanobu Iizuka, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 17/085,548

(22) Filed: Oct. 30, 2020

(65) Prior Publication Data

US 2021/0048110 A1 Feb. 18, 2021

Related U.S. Application Data

(62) Division of application No. 16/113,349, filed on Aug. 27, 2018, now Pat. No. 10,876,641.

(30) Foreign Application Priority Data

Sep. 26, 2017 (JP) ................................ 2017-184855

(51) Int. Cl.
*F16K 7/14* (2006.01)
*F16K 7/17* (2006.01)
(Continued)

(52) U.S. Cl.
CPC ................ *F16K 7/14* (2013.01); *F16K 7/12* (2013.01); *F16K 7/17* (2013.01); *F16K 27/0236* (2013.01);
(Continued)

(58) Field of Classification Search
CPC .......... F16K 7/14; F16K 7/17; F16K 27/0236; F16K 31/1221; F16K 31/1225;
(Continued)

(56) References Cited

U.S. PATENT DOCUMENTS 5,722,638 A ‡ 3/1998 Miller ..................... F16K 1/305
251/266
5,950,674 A * 9/1999 Wylie .................... G01N 30/20
137/597
(Continued)

FOREIGN PATENT DOCUMENTS

JP 2007-064333 3/2007

*Primary Examiner* — Hailey K. Do
(74) *Attorney, Agent, or Firm* — Wenderoth, Lind & Ponack, L.L.P.

(57) ABSTRACT

By preventing a twist of the diaphragm when assembled, various adverse effects arising from such a twist of the diaphragm are completely eliminated. Provided is a set of jigs for assembling a valve including a pair of above and below fixing jigs, a rotation-stop jig, and a fixing means: the rotation-stop jig is inserted and fixed to the above fixing jig in a non-rotational state; the fixing means fixes non-rotatably and attachably the rotation-stop jig and a bonnet of the valve to each other; a body of the valve is inserted and fixed to the below fixing jig in a non-rotational state; the bonnet and the body are fixed independently from each other in a non-rotational state, thereby preventing an outer periphery of a diaphragm from twisting in which a lower surface of an outer periphery of the bonnet and an outer seal part of the body are tightly attached to and hold the outer periphery of the diaphragm.

4 Claims, 6 Drawing Sheets

(51) Int. Cl.
*F16K 27/02* (2006.01)
*F16K 31/122* (2006.01)
*F16K 7/12* (2006.01)

(52) U.S. Cl.
CPC ...... *F16K 31/1221* (2013.01); *F16K 31/1225* (2013.01); *F16K 31/1226* (2013.01)

(58) Field of Classification Search
CPC ............. F16K 31/1226; F16K 31/1266; F16K 31/124; F16K 31/08
See application file for complete search history.

(56) References Cited

U.S. PATENT DOCUMENTS

| | | | | |
|---|---|---|---|---|
| 6,196,523 | B1 ‡ | 3/2001 | Miyata | F16K 1/302 251/264 |
| 8,172,197 | B2 ‡ | 5/2012 | Gu | F16K 7/17 137/625.27 |
| 2006/0038154 | A1* | 2/2006 | Fukano | F16K 41/103 251/321 |
| 2010/0224806 | A1* | 9/2010 | Yamamoto | F16K 31/128 251/58 |
| 2017/0314687 | A1‡ | 11/2017 | Hirai | F16K 3/12 |
| 2018/0355983 | A1* | 12/2018 | Nabei | F16K 7/14 |
| 2019/0128433 | A1‡ | 5/2019 | Aoyama | F16K 31/1225 |

\* cited by examiner
‡ imported from a related application

SET OF JIGS FOR ASSEMBLING A VALVE, AND A DIAPHRAGM VALVE ASSEMBLED WITH THE SAME

BACKGROUND OF THE INVENTION

1. Field of the Invention

The present invention relates to a set of jigs for assembling a valve, and a diaphragm valve assembled with the same and, in particular, to a set of jigs for assembling a valve, and a diaphragm valve assembled with the same highly suitable for ALD (Atomic Layer Deposition) process.

2. Description of the Related Art

In recent years, as semiconductor manufacture process, the introduction of ALD (Atomic Layer Deposition) process has been developed. In the ALD process, in an atmosphere at high temperatures (approximately 200 degrees Celsius), gases of a plurality of types such as a precursor, an inert gas, and an oxidizing species gas are alternately supplied from a gas supply system to a chamber by high-speed switching (gas supply/stop operation) of an extremely short cycle, and atomic layers are homogeneously and uniformly stacked one by one at a nano level on a wafer in the chamber to form a thin film.

In response to this supply and stop of the gases, a valve provided to a gas flow path performs an extremely large number of opening/closing operations within an extremely short cycle time. Moreover, although the opening and closing operations are successively performed such an extremely large number of times, a fluid has to be accurately and tightly sealed at every occasion without degradation in valve performance. Therefore, for a valve for use in a gas flow path system in the ALD process, a significant improvement in durability of the valve (diaphragm) is demanded, compared with prior arts.

On the other hand, as a valve for use in a gas supply system in a semiconductor manufacturing apparatus including a valve for ALD process, a direct-touch diaphragm valve is generally used in view of advantages brought from its characteristics and so forth. The same goes for the current ALD process. FIG. 7 depicts a conventional valve of this type, as will be described further below. Regarding valve durability of the valve of this type, in view of its structure, durability of a diaphragm (valve body) which is always in contact with the fluid and closes the fluid by being deformed in a curved shape whenever the valve is opened and closed is a crucial factor which influences durability in valve performance. In the valve of this type, this diaphragm is formed in a circular shape and is held in a valve chamber, and durability of the diaphragm may be greatly influenced by contribution from the structure of an outer circumferential seal part which seals an outer peripheral side of the diaphragm.

That is, durability of the diaphragm which repeats flexible deformation by an external force and self-resilient force is influenced not only by its structure such as the material and shape but also naturally by contribution from the structure of a portion which directly acts on the diaphragm with an external force and stress. On the other hand, since the valve of this type is configured to seal the inside of the valve chamber as being held to a fixing side at least at the outer circumferential seal part, the diaphragm always receives an action of stress from this outer circumferential seal part. A stress distribution formed based on this action directly influences the characteristics of the (metal) diaphragm such as (metal) fatigue and fatigue breakdown. Thus, the structure of the outer circumferential seal part may greatly influence durability of the diaphragm and, in turn, durability of the valve. In particular, in the valve for ALD process in which the number of times of opening/closing operation is significantly larger than ever and thus the number of times of deformation of the diaphragm repeating bending deformation with the outer circumferential seal part being supported as a fixing side is quite large, influences of the structure of the outer circumferential seal part on durability of the valve (diaphragm) become apparent in accordance with the valve driving time.

By contrast, the conventional structure of the outer circumferential seal part of the valve is generally as follows. That is, with an outer circumferential edge part of a diaphragm being mounted on an annular seal part formed on an outer periphery of a valve chamber, a diaphragm pressing member (bonnet) formed in an annular or circular shape is mounted on the diaphragm in the above-described state; a screwing member is further screwed from thereabove to pressurize the bonnet from above; and the outer circumferential edge part of the diaphragm is closed from above by screwing of the screwing member via the bonnet, thereby configuring the outer circumferential seal part.

Also, an example of the valve for ALD is suggested in Japanese Unexamined Patent Application Publication No. 2007-64333. Also in this document, the structure of the outer seal part is described such that the outer circumferential edge part of the metal diaphragm is mounted on a protrusion of the inner circumferential surface of the valve seat and is pressurized, with a lower end of a cylindrical holding adaptor inserted into the valve chamber being screwed to a screw part of the body, to a protrusion side of the body via the holding adaptor made of stainless steel, thereby being tightly attached and fixed in a airtight state.

BRIEF SUMMARY OF THE INVENTION

However, in a general structure of the outer circumferential seal part such as, for example, that disclosed in Japanese Unexamined Patent Application Publication No. 2007-64333, as described above, the bonnet mounted on the diaphragm is fastened as being in a unfixed free state, with the screwing member rotating by screwing from above. Therefore, the bonnet may co-rotate with the rotation of the screwing member. In particular, when screwing of the screwing member is about to complete, a contact force is increased to make the bonnet prone to co-rotation. When the outer circumferential seal part is closed as co-rotation occurs, the outer circumferential edge part of the diaphragm is tightly attached vertically as being twisted.

With the outer circumferential edge part being twisted, an unwanted distortion or the like occurs in the diaphragm due to an unnatural stress load different from an originally-assumed stress distribution to impair durability and so forth. Thus, intrinsic performance may not be able to be provided. Specifically, an unnatural stress may degrade self-resilience characteristics of the diaphragm; a decrease in repetition speed of the diaphragm or other factors may impair valve-open performance of the valve; sealing performance of the valve may be impaired by, for example, degradation in adhesiveness with the valve seat due to a change in deformation characteristics of the diaphragm; or an occurrence of an unintentional individual difference in each diaphragm (outer circumferential seal part) may cause variations in quality of valve products.

Furthermore, the diaphragm, which is directly exposed to the fluid in the valve chamber, also directly influences the Cv value of the valve. Since a twist of the outer circumferential edge part has a significant adverse effect on distortion characteristics of the diaphragm, the shape of a flow path provided between the valve seat and the diaphragm may be significantly changed and, as a result, an adverse effect may occur also in the Cv value of the valve, thereby causing variations among valves. Moreover, since the outer circumferential edge part is closed as being rubbed together and twisted, not only the diaphragm itself but also portions on a bonnet side and/or a valve chamber side which vertically and tightly attach the diaphragm may be damaged. Thus, an adverse effect may occur also in sealing performance of the outer circumferential seal part.

The present invention has been developed to solve the above-described problems, and has an object of providing a set of jigs for assembling a valve, and a diaphragm valve assembled with the same in which a twist of the diaphragm when assembled is prevented to completely eliminate various adverse effects arising due to such a twist of the diaphragm.

To achieve the above-described object, one aspect of the present invention is directed to a set of jigs for assembling a valve comprising a pair of above and below fixing jigs, a rotation-stop jig, and a fixing means: the rotation-stop jig is inserted and fixed to the above fixing jig in a non-rotational state; the fixing means fixes non-rotatably and attachably the rotation-stop jig and a bonnet of the valve to each other; a body of the valve is inserted and fixed to the below fixing jig in a non-rotational state; the bonnet and the body are fixed independently from each other in a non-rotational state, thereby preventing an outer periphery of a diaphragm from twisting in which a lower surface of an outer periphery of the bonnet and an outer seal part of the body are tightly attached to and hold the outer periphery of the diaphragm.

Another aspect of the present invention is directed to a set of jigs for assembling a valve, further comprising an fastening nut which is screwed to an opening of the body, and the outer seal part is configured by screwing of the fastening nut with a tool.

Still another aspect of the present invention is directed to a set of jigs for assembling a valve, the fixing means is configured by a plurality of pins to be commonly inserted into the bonnet and the rotation-stop jig.

Yet another aspect of the present invention is directed to a diaphragm valve assembled with a set of jigs for assembling a valve.

According to one aspect of the present invention, a twist of the diaphragm when assembled is prevented, and thereby a significant improvement in an opening/closing durability count and an improvement in valve seat sealing performance can be achieved. Furthermore, useful effects can be provided, stabilization of the valve opening/closing speed, reduction in variations in the Cv value among valves, reduction in damage of the outer seal part, and an improvement in sealing performance.

According to another aspect of the present invention, the bonnet and the rotation-stop jig can be reliably fixed by simple fixing means so as not to rotate.

According to still another aspect of the present invention, by taking the step of inserting the plurality of pins into the fixing hole parts equidistantly bored in the bonnet, the bonnet and the rotation-stop jig can be fixed.

According to yet another aspect of the present invention, it is possible to easily set the body to one fixing jig and the rotation-stop jig to the other fixing jig, and co-rotation of the bonnet can be reliably prevented.

According to yet another aspect of the present invention, with the paired fixing jigs being fixed by the vise, the fastening nut can be reliably fastened. Therefore, co-rotation of the bonnet can be prevented, and the outer seal part can be reliably tightly attached.

According to yet another aspect of the present invention, it is possible to provide a diaphragm valve with reduced various adverse effects arising from a twist of the diaphragm when assembled. A twist of the diaphragm when assembled is prevented, and thereby a significant improvement in an opening/closing durability count and an improvement in valve seat sealing performance can be achieved. Furthermore, useful effects can be provided, stabilization of the valve opening/closing speed, reduction in variations in the Cv value among valves, reduction in damage of the outer seal part, and an improvement in sealing performance.

According to yet another aspect of the present invention, the base body of an actuator for an automatic valve or a manual valve can be replaced. Therefore, with the valve body part maintained, a change to an actuator of another type can be easily made. For example, a change from an NC valve to a NO valve or to a manual valve or the like can be easily made.

According to yet another aspect of the present invention, it goes without saying that the present invention can be applied to an automatic valve or manual valve of a normal diaphragm valve. In particular, the present invention is suitable for a diaphragm valve for ALD, and its effects are outstanding.

DETAILED DESCRIPTION OF THE INVENTION

Figure 1:
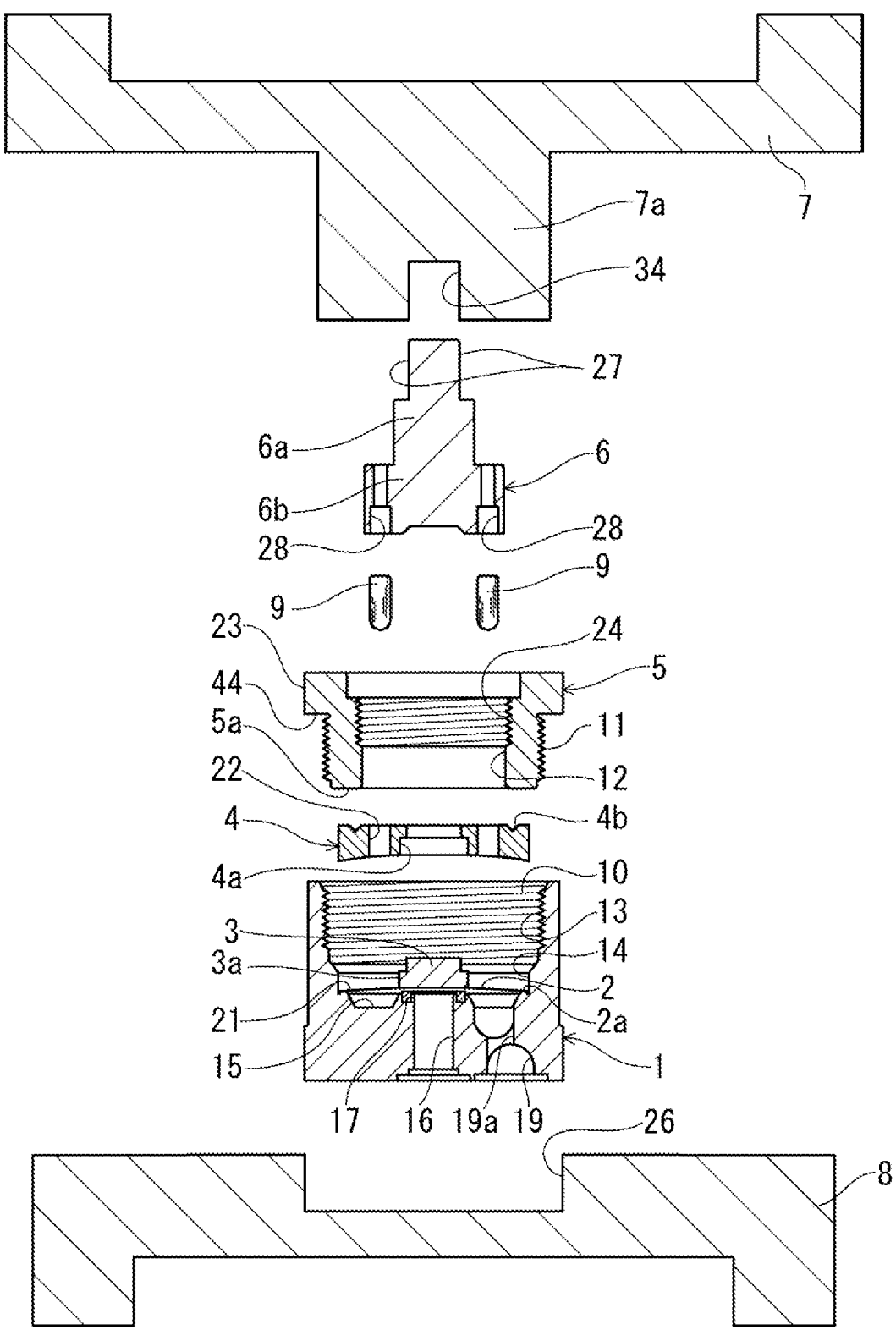
FIG. 1 is an exploded sectional view of an exploded state of an assembly structure of a diaphragm valve in one embodiment.

FIG. 1 depicts one embodiment (example) in the present invention, and is an exploded sectional view of an exploded state of an assembly structure of an embodiment of a diaphragm valve in the present example. First, with reference to FIG. 1, each structure of jigs for assembling for use in a diaphragm valve assembling method of the present example is described. In the assembling method of the present example, as a jig for assembling for preventing a twist of a diaphragm 2 at the time of assembling a body 1, the diaphragm 2, a diaphragm piece 3, a bonnet 4, and a fastening nut 5 which configure the diaphragm valve of the present example, a set of jigs formed of a rotation-stop jig 6, paired fixing jigs 7 and 8, and four pins 9 is used.

Figure 2:
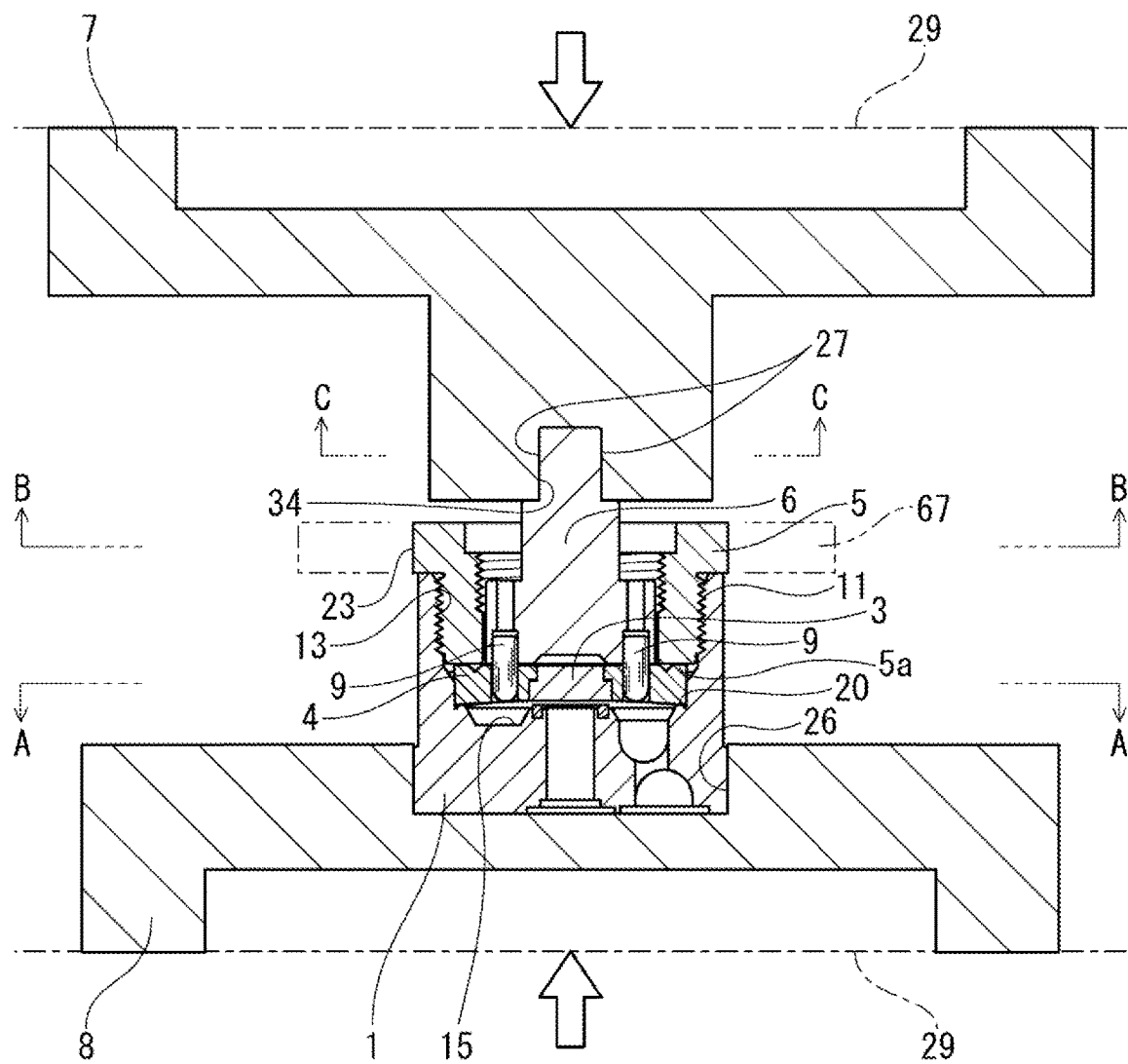
FIG. 2 is a sectional view of the assembly structure depicted in FIG. 1.
Figure 3:
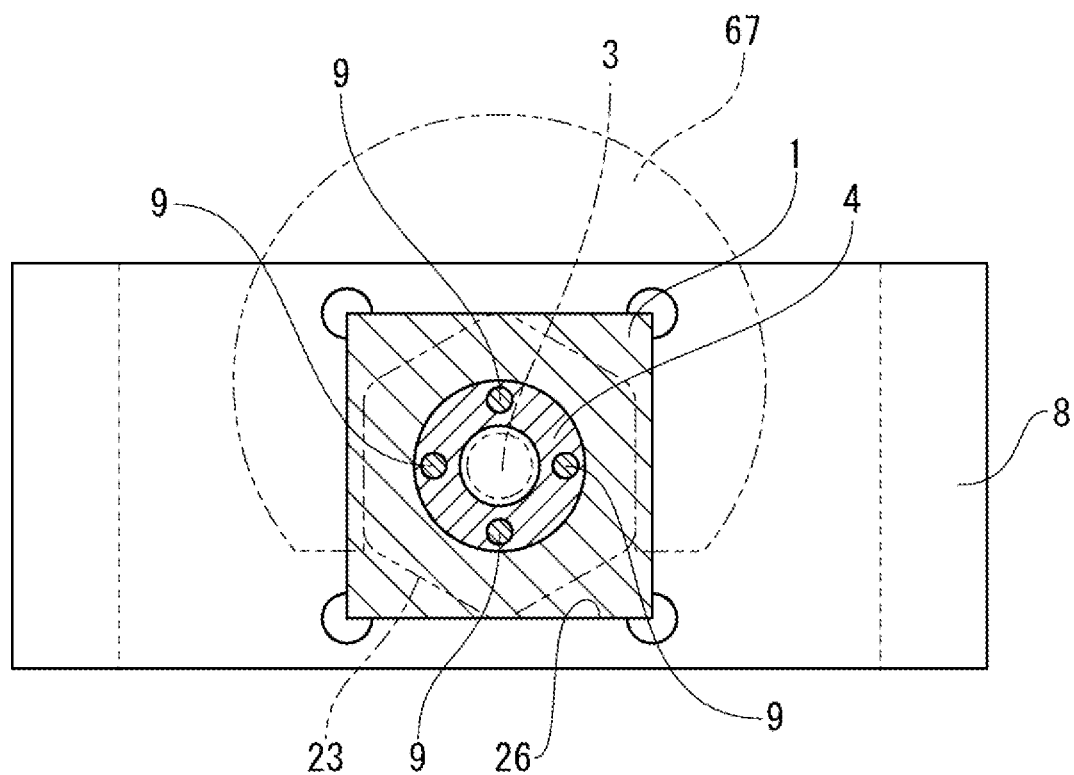
FIG. 3 is a sectional view of FIG. 2 along an A-A line.

First, the structure of each component configuring the diaphragm valve of the present example is described. In FIG. 1 to FIG. 3, the body 1 is integrally formed in a substantially rectangular parallelepiped outer shape and made of SUS 316L, and has an upper opening 10 (inner circumferential surface of a cylindrical part) formed with a female screw part 13 to which a male screw part 11 of the fastening nut 5, which will be described further below, can be screwed. On a side surface on a depth side of the opening 10, a cylindrical fit-in part 14 which can fit in the outer circumferential surface of the bonnet 4, which will be described further below, is formed. On the bottom surface on the depth side of the opening 10, a space of an annular valve chamber 15 is formed.

A primary flow path 16 is provided by boring in the body 1 at an axial center position upward from its bottom surface side so as to communicate and open to the space of the valve chamber 15. To an attachment groove part formed on a circumferential edge part of this opening, a ring-shaped valve seat 17 made of PFA is fixedly attached. As will be described further below, after valve assembling, the lower surface of the metal diaphragm 2 at the center is pressurized by a rod 18 to become flexibly deformed and be able to be adhered to (seated on) the upper surface of the valve seat 17. Also, a secondary flow path 19 communicates and opens from part of the bottom surface of the valve chamber 15 toward the bottom surface side of the body 1. In the present example, a flow-path constricted part 19a is provided to part of the course of the flow path. Also, on the outer circumferential edge part of the valve chamber 15 of the body 1, an annular convex part 21 configuring an outer seal part 20, which will be described further below, is formed so as to protrude upward to have a trapezoidal cross section.

In FIG. 1 to FIG. 3, the diaphragm 2 is formed in a substantially disc-like outer shape with a curved surface mildly protruding toward one side (upward) and having its center as a vertex in a natural state, and has an elastic force allowing self-resilience to the form of this natural state. In the present example, a predetermined number of SPRON-made (metal-made) diaphragm members are stacked to configure a valve film of the diaphragm valve. The diaphragm piece 3 is formed in a short cylindrical shape with a flange part 3a, and is in a state of being mounted on the upper surface side of the diaphragm 2 so as to be vertically movable with flexible deformation of the diaphragm 2. After completion of valve assembling, the diaphragm piece 3 is positioned and accommodated inside the valve as being loosely fitted therein.

In FIG. 1 to FIG. 3, the bonnet 4 is formed in a substantially flat cylindrical shape, and has an attachment hole 4a open at an axial center position at the center so as to allow the diaphragm piece 3 to fit therein to be able to vertically slide. This attachment hole 4a is provided with a step part mated to the flange part 3a of the diaphragm piece 3. The outer circumferential surface of the bonnet 4 has a shape mated to the fit-in part 14 of the body 1.

In FIG. 1 and FIG. 2, in the upper surface of the bonnet 4, an annular groove 4b is formed concentrically with the axial center so as to have a substantially V-shaped cross section. As will be described further below, the upper surface of the bonnet 4 will face or make contact with a lower end 5a of the fastening nut 5 and a lower end face of a base body 31. This annular groove 4b has an effect of decreasing an area of contact between the lower end 5a of the fastening nut 5 and the upper surface of the bonnet 4 to reduce a sliding resistance. Also as depicted in FIG. 3, the bonnet 4 has fixing hole parts 22 (fixing parts) at four locations symmetrical with respect to the axial center. These fixing hole parts 22 each have a sectional shape formed so as to be accurately mated with the sectional shape of each pin 9, which will be described further below. The arrangement of the fixing hole parts 22 is not limited to this example, and any arrangement can be selected in accordance with implementation. For example, the fixing hole parts 22 may be provided symmetrically at two or six locations, or one fixing hole part 22 may be provided at one location as an appropriate position.

As will be described further below, the bonnet 4 pressurizes an outer periphery 2a of the diaphragm 2 into the body 1 having the valve seat 17 provided to the valve chamber 15 and the diaphragm 2 arranged above, thereby configuring the diaphragm valve assembly structure of the present invention.

In FIG. 1 to FIG. 4, the fastening nut 5 of the present example is a nut member formed in a substantially cylindrical shape. On the outer peripheral side of the fastening nut 5, an engaging part 23 in a hexagonal shape is provided to protrude at one end side, and the male screw part 11 is also formed. The inner peripheral side of the fastening nut 5 serves as a through hole 12 having a substantially circular cross section, and a female screw part 24 is formed on part of the through hole 12.

As will be described further below, the fastening nut 5 is screwed to the opening 10 of the body 1, thereby configuring the diaphragm valve assembly structure of the present invention.

Figure 5:
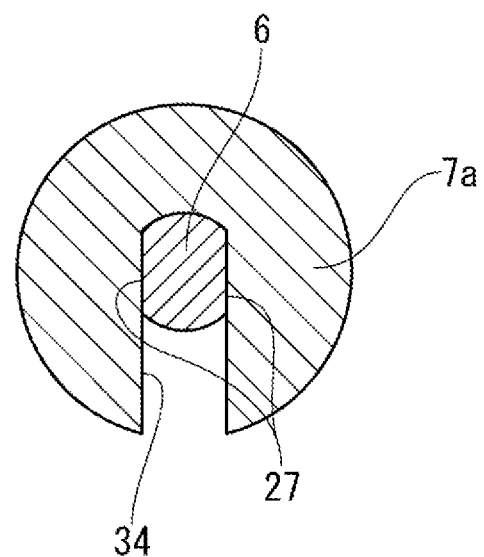
FIG. 5 is a sectional view of FIG. 2 along a C-C line.

Next, each structure of the jigs for use in the assembling method of the present example is described. In FIGS. 1, 2, and 5, in the fixing jig 7 depicted above, an insertion fixing part 7a in a substantially columnar shape is integrally formed so as to protrude from a base part formed in a substantially rectangular plate shape (rectangle). As depicted in FIG. 5, this insertion fixing part 7a is notched to form an engaging surface 34 as a single groove from the outer circumferential surface side of the insertion fixing part 7a to the center position. As will be described further below, the shape of this engaging surface 34 is mated to the shape of the rotation-stop jig 6, and thus the engaging surface 34 allows insertion and fixing of the rotation-stop jig 6.

In FIG. 1 to FIG. 3, the fixing jig 8 depicted below also has a base part formed in a substantially rectangular plate shape (rectangle), and is cut to have a fixing groove 26 recessed in a substantially square shape as an insertion fixing part in which the body 1 is to be fit. As will be described further below, the shape of this fixing groove 26 is mated with the lower outer shape of the body 1 (these shapes are similar figures), and thus allows insertion and fixing of the body 1.

In FIG. 1 and FIG. 2, the rotation stop jig 6 is integrally formed as a whole in a substantially columnar shape so that a small-diameter part 6a is on an upper side and a large-diameter part 6b is on a lower side in these drawings. The small-diameter part 6a has a notched step surface 27 formed with a width across flats. The surface width of this notched step surface 27 is mated with the groove width of the engaging surface 34, and thus allows insertion and fixing of this notched step surface 27 to the engaging surface 34 in a non-rotational state.

On the other hand, the large-diameter part 6b is provided with fixing holes 28 each mated to the shape of the pin 9 to allow fitting-in and fixing of the pin 9. As depicted in FIG. 3, to allow the pins 9 to be commonly inserted into the bonnet 4 and the rotation-stop jig 6, these fixing holes 28 are required to be provided so as to be matched with the hole diameter and arrangement of the fixing hole parts 22. As will be described further below, these fixing holes 28 have to be provided so that at least one or more fixing holes 28 match the fixing hole parts 22 when the end face of the large-diameter part 6b of the rotation-stop jig 6 faces the upper surface of the bonnet 4 at the time of valve assembling.

As will be described further below, the rotation-stop jig 6 is inserted to a through hole 12 of the fastening nut 5, thereby configuring the diaphragm valve assembly structure of the present invention.

In FIG. 1 to FIG. 3, each pin 9 has a substantially circular cross section, and any material, diameter, and length can be selected in accordance with implementation. This pin 9 is a jig for use as being temporarily interposed between the rotation-stop jig 6 and the bonnet 4 in order to prevent mutual rotation of these. Thus, at least two or more pins 9 are required. Also, the pin 9 suitably has a diameter formed within a range without trouble for use so as accurately match both of the hole diameters of the fixing hole 28 and the fixing hole part 22, in order to accurately and firmly lock rotation without play or slight backlash with respect to the rotation-stop jig 6 and the bonnet 4 when the pin 9 is fitted and fixed to the fixing hole 28 (on a rotation-stop jig 6 side) and the fixing hole part 22 (on a bonnet 4 side) and rotation acts on these holes.

As described above, the pin 9 configures the diaphragm valve assembly structure as fixing means which fixes the rotation-stop jig 6 and the bonnet 4.

Next, the diaphragm valve assembling method in the present example is described. The assembling method of the present example has, firstly, a step of inserting the bonnet 4 which pressurizes the outer periphery 2a of the diaphragm 2 into the body 1 having the valve seat 17 provided to the valve chamber 15 and the diaphragm 2 arranged thereabove.

As depicted in FIG. 1, for the body 1 with the valve seat 17 fixed by swaging to the attachment groove part, the suitable diaphragm 2 is prepared. With a convex side of the diaphragm 2 taken as an upper side, the diaphragm 2 is arranged so that the lower surface of the outer periphery 2a is appropriately positioned on the annular convex part 21. Here, it goes without saying that the diaphragm 2 should not be placed upside down. It should also be noted that the outer seal part 20 cannot be appropriately configured unless the outer periphery 2a is appropriately arranged on the convex part 21.

Next, on the diaphragm 2 arranged as described above, the diaphragm piece 3 and the bonnet 4 are arranged. Any arrangement of these can be made. Since the shape of the flange part 3a of the diaphragm piece 3 and the shape of the attachment hole 4a of the bonnet 4 are mated to each other, the diaphragm piece 3 and the bonnet 4 can be collectively put on the diaphragm 2, with the diaphragm piece 3 fitted into this attachment hole 4a. Also in this case, it should be noted that the outer seal part 20 cannot be appropriately configured unless the lower surface of the outer periphery of the bonnet 4 is arranged so as to be appropriately positioned on the upper surface of the outer periphery 2a of the diaphragm 2.

Next, the method has a step of screwing the fastening nut 5 to the opening 10 of the body 1 so as to face the outer periphery 2a of the diaphragm 2.

That is, after the bonnet 4 is inserted to the body 1 to vertically and appropriately interpose the outer periphery 2a of the diaphragm 2 as described above, the fastening nut 5 is inserted into the opening 10, thereby screwing the male screw part 11 into the female screw part 13 of the opening 10. This screwing is stopped to the extent that the lower end 5a of the fastening nut 5 comes close to the upper surface of the bonnet 4 in a noncontact manner or makes contact therewith, and more fastening should be prevented. For reference, since screwing movement after the fastening nut 5 makes contact with the upper surface of the bonnet 4 hardly occurs, only with a slight fastening margin left, this contact state is approximately identical to the state of the fastening nut 5 and the bonnet 4 depicted in FIG. 2.

Next, the method has a step of fixing the rotation-stop jig 6 inserted through the through hole 12 of the fastening nut 5 and the bonnet 4 via the fixing means. Here, the fixing means is means that can non-rotatably and attachably fix the rotation-stop jig 6 and the bonnet 4 to each other, and any means can be selected in accordance with implementation. In the present example, as depicted in FIG. 1 to FIG. 3, lower portions of the plurality of pins 9 are fixed to the fixing parts formed on the bonnet 4, and upper portions of the plurality of pins 9 are inserted into the fixing holes 28 of the rotation-stop jig 6 to assemble the bonnet 4 and the rotation-stop jig 6 in a non-rotational state, thereby configuring fixing means. Furthermore, in the present example, the fixing parts are equidistantly-bored fixing hole parts 22, and the pins 9 are inserted into these fixing hole parts 22 for fixing.

As depicted in FIG. 3, the bonnet 4 is provided with four fixing hole parts 22 symmetrically as the fixing parts and, although not depicted, the rotation-stop jig 6 is also formed with the fixing holes 28 at positions and with shapes mated to these fixing hole parts 22 at four locations. Therefore, as depicted in FIG. 1 and FIG. 2, the lower portions of the four pins 9 are first fitted into the fixing hole pars 22 of the bonnet 4 arranged inside the body 1. After the upper portions of the respective pins 9 protrude, a large-diameter part 6b side of the rotation-stop jig 6 where the fixing holes 28 are open is inserted into the through hole 12. This allows the upper portions of the respective protruding pins 9 to be fitted in the respective fixing holes 28. With this, the upper portions of the four pins 9 are fitted to the rotation-stop jig 6, and the lower portions thereof are fitted to the bonnet 4. Thus, the rotation-stop jig 6 and the bonnet 4 are assembled to each other via the pins 9 in a non-rotational state.

As the fixing means, other than the above-described means with the pins 9 interposed, it is possible to apply, for example, means in which mutually-engageable asperities are appropriately formed on a lower end face of the large-diameter part 6b of the rotation-stop jig 6 and the upper surface of the bonnet 4 for simple non-rotational assembly without using the pins 9, which are extra members.

Next, the method has a step of fixing the body 1 and the rotation-stop jig 6 via the fixing jigs 7 and 8 and fastening the fastening nut 5, with the bonnet 4 being in a non-rotational state, to tightly attach the bonnet 4 to the outer seal part 20 of the diaphragm 2. Any means can be selected as fixing means which fixes these fixing jigs 7 and 8 and the body 1 or the rotation-stop jig 6 in accordance with implementation. In the present example, as depicted in FIG. 1 to FIG. 3, the body 1 having a rectangular shape is inserted and fixed to the fixing groove 26 of a similar shape formed on one fixing jig 8 so as to be in a non-rotational state, and the notched step surface 27 formed on the upper part of the rotation-stop jig 6 is inserted and fixed to the groove-shaped engaging surface 34 formed in the other fixing jig 7 so as to be in a non-rotational state.

As depicted in FIG. 1 and FIG. 2, on the upper side of the rotation-stop jig 6 assembled to the bonnet 4 via the pins 9, the notched step surface 27 of the small-diameter part 6a protrudes. As depicted in FIG. 5, the notched step surface 27 is fixed by being fitted in the groove-shaped engaging surface 34 formed in the upper fixing jig 7. As depicted in FIG. 5, in this state, the engaging surface 34 and the notched step surface 27 are fixed in a non-rotational state. On the other hand, as depicted in FIG. 1 to FIG. 3, the lower part of the body 1 is also fitted in the fixing groove 26 of the lower fixing jig 8 formed in the same shape as that of the lower part. As with the above, this fixing is in a non-rotational state.

Next, with the paired fixing jigs 7 and 8 fixed by a vise 29, the engaging part 23 of the fastening nut 5 is fastened by a tool typified by a torque wrench 67 to tightly attach the bonnet 4 to the outer seal part 20 of the diaphragm 2.

As depicted in FIG. 2, from the lower side of the lower fixing jig 8 fixed to the body 1 and the upper side of the upper fixing jig 7 fixed to the rotation-stop jig 6, the jigs 7 and 8 are pinched by the vise 29 to be tightly held and fixed. Thus, the bonnet 4 is fixed to a stationary system via the pins 9 and the rotation-stop jig 6, the upper fixing jig 7, and the vise 29 in a non-rotational manner, and the body 1 is also fixed to the stationary system via the lower fixing jig 8 and the vise 29, independently from the above-described fixing structure of the bonnet 4 to the stationary system.

Figure 4:
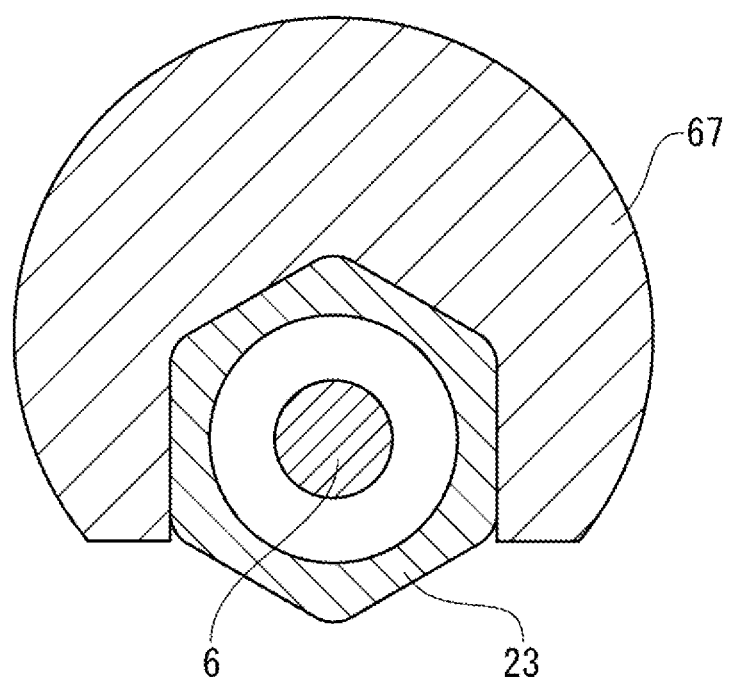
FIG. 4 is a sectional view of FIG. 2 along a B-B line.

As depicted in FIG. 2 and FIG. 4, finally, in the tightly-attached and fixed state by the vise 29 as described above, the hexagonal-shaped engaging part 23 of the fastening nut 5 is open to the outside, and the fastening nut 5 can thus be rotated and fastened by laterally engaging the torque wrench 67 with this engaging part 23. With this, screwing of the fastening nut 5 can be appropriately completed to configure the outer seal part 20. With this, the valve assembling method of the present example is completed. Thereafter, the set of the jigs used for this assembling are appropriately removed, and the procedure proceeds to another component assembling process.

As depicted in FIG. 1, the diaphragm valve assembly structure of the present invention is configured to include the bonnet 4 which pressurizes the outer periphery 2a of the diaphragm 2 into the body 1 having the valve seat 17 provided to the valve chamber 15 and the diaphragm 2 arranged thereabove, the fastening nut 5 to be screwed to the opening 10 of the body 1 to be inserted to the outer periphery of the bonnet 4, the rotation-stop jig 6 inserted through the through hole 12 of the fastening nut 5, the fixing means (pins 9) which fixes the rotation-stop jig 6 and the bonnet 4, and the outer seal part 20 inside the body 1 to tightly attach the bonnet 4 to the outer periphery 2a of the diaphragm 2 by fastening the fastening nut 5, with the bonnet 4 being in a non-rotational state, thereby preventing a twist of the diaphragm 2 when assembled.

As described above, in the present invention, the bonnet 4 is fixed to the stationary system via one jig, and the body 1 is also fixed to the stationary system via the other jig, thereby preventing co-rotation of the bonnet 4 and the body 1 by fixing respectively based on independent fixing (rotation-stop) mechanisms. Alternatively, for example, co-rotation of the bonnet 4 and the body 1 may be prevented without using a jig for assembling, such as providing mutually-engageable asperities to the outer circumferential surface of the bonnet 4 and the inner circumferential surface of the fit-in part 14 of the body 1, or may be prevented based on simpler means.

Figure 6:
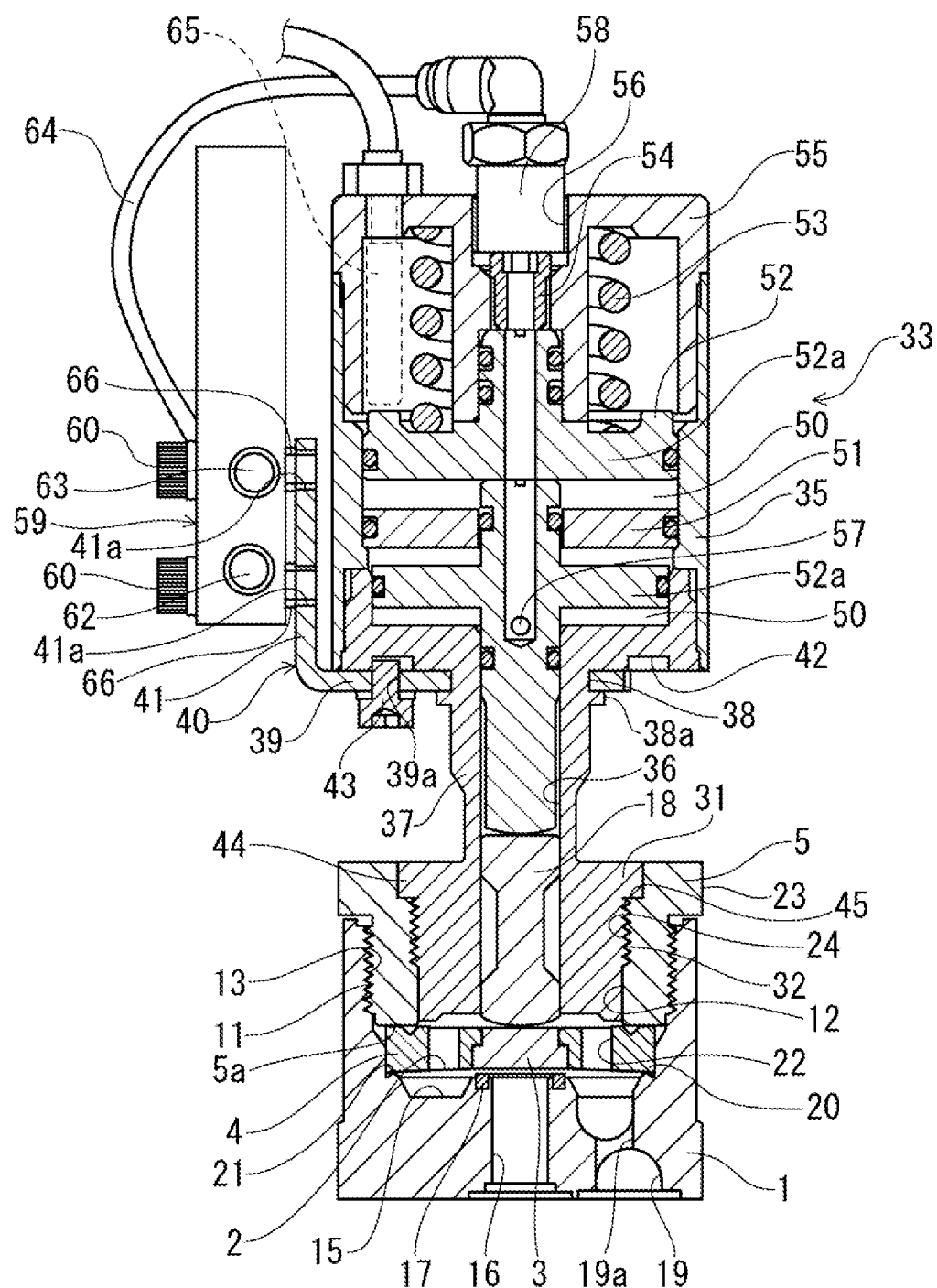
FIG. 6 is a sectional view with an actuator attached to the diaphragm valve depicted in FIG. 2.

An example of the diaphragm valve assembled by using the assembling method of the present example is described next. FIG. 6 is a longitudinal sectional view of the diaphragm valve (diaphragm valve equipped with an actuator for an automatic valve) in which the body 1, the diaphragm 2, the diaphragm piece 3, the bonnet 4, and the fastening nut 5 which configure the above-described diaphragm valve of the present example are completely assembled and then the male screw part 32 at the lower part of the base body 31 is screwed to the female screw part 24 of the through hole 12 of the fastening nut 5 to attach an actuator main body 33 to complete valve assembling.

As depicted in FIG. 6, the actuator main body 33 of the present example is an air-operated diaphragm valve for an automatic valve. Any actuator can be selected in accordance with implementation, such as an actuator for a manual valve. In the present example, any actuator including a base body having a male screw part usable by being screwed to the female screw part 24 can be detachably attached as appropriate in accordance with implementation. Also, while the diaphragm valve in FIG. 6 is suitable as, in particular, a valve for Atomic Layer Deposition (ALD), the valve is not meant to be limited to this, and any of valves for various use purposes can be configured as appropriate.

In FIG. 6, the base body 31 is a member to be incorporated into a base surface part of the actuator main body 33. An upper side of the base body 31 is formed in a cylindrical shape having a diameter substantially equal to that of a casing 35, which will be described further below, and has formed therein a male screw that can be screwed to a female screw on a lower part of the casing 35. On a lower side of the base body 31, a male screw part 32 is formed that can be screwed to the female screw part 24 of the fastening nut 5. At an axial center position at the center of the base body 31, an attachment hole 36 is open, which is formed in a longitudinally-elongated shape and vertically slidable with the rod 18 as a stem fitted therein. Furthermore, as a measure for insulating heat from a high-temperature fluid, an axial attachment part 37 between the upper side and the lower side is provided in a constricted shape to decrease the cross-sectional area, thereby reducing heat conductivity therebetween.

Also in FIG. 6, an annular holding part 38 is formed at an upper end position of the axial attachment part 37 of the base body 31. The holding part 38 of the present example is an annular groove defined by an annular flange part 38a and formed so as to surround the axial attachment part 37. To this groove, an insertion groove, not depicted but described further below, formed in an attachment part 39 of an attachment member 40 can be fitted. Also, an annular groove 42 is formed concentrically with the axial center on the lower surface side of the upper part of the base body 31. As described further below, since the annular groove 42 serves as a screw clearance groove for a bolt 43, the diameter, groove width, and depth of this annular groove 42 is set as appropriate in accordance with the position of a hole part 39a of the attachment part 39 and the bolt 43 to be inserted into this hole part 39a. Although not depicted, the axial attachment part 37 has a concave part formed by being notched with a width across flats for clamping.

Furthermore, in FIG. 6, a flange part 44 is provided near an end edge of the male screw part 32 of the base body 31. To be mated to this flange part 44, a stopper part 45 is formed at an end on an opening side of the female screw part 24 of the fastening nut 5 by being notched in a concave shape. When the male screw part 32 and the female screw part 24 are screwed to each other, screwing of this flange part 44 is appropriately locked by the stopper part 45 to prevent excessive fastening.

If co-rotation of the fastening nut 5 and the bonnet 4 is prevented by the assembling method of the present invention as described above, since the structure of the present example is such that the lower end face of the base body 31 faces the upper surface of the bonnet 4 in a subsequent assembling step, excessive screwing of the base body 31 may cause its lower end face to make contact with the upper surface of the bonnet 4 and thereby have an adverse influence such as co-rotation. If so, there is a possibility that an adverse effect arises such as a twist of the outer seal part 20 (diaphragm 2). This may even impair the meaning of the present invention completely. Thus, by providing the screwing stopper part 45, excessive fastening is prevented, and the possibility of an adverse effect on the bonnet 4 with the outer seal part 20 configured by completely closing the diaphragm 2 is avoided.

Figure 7:
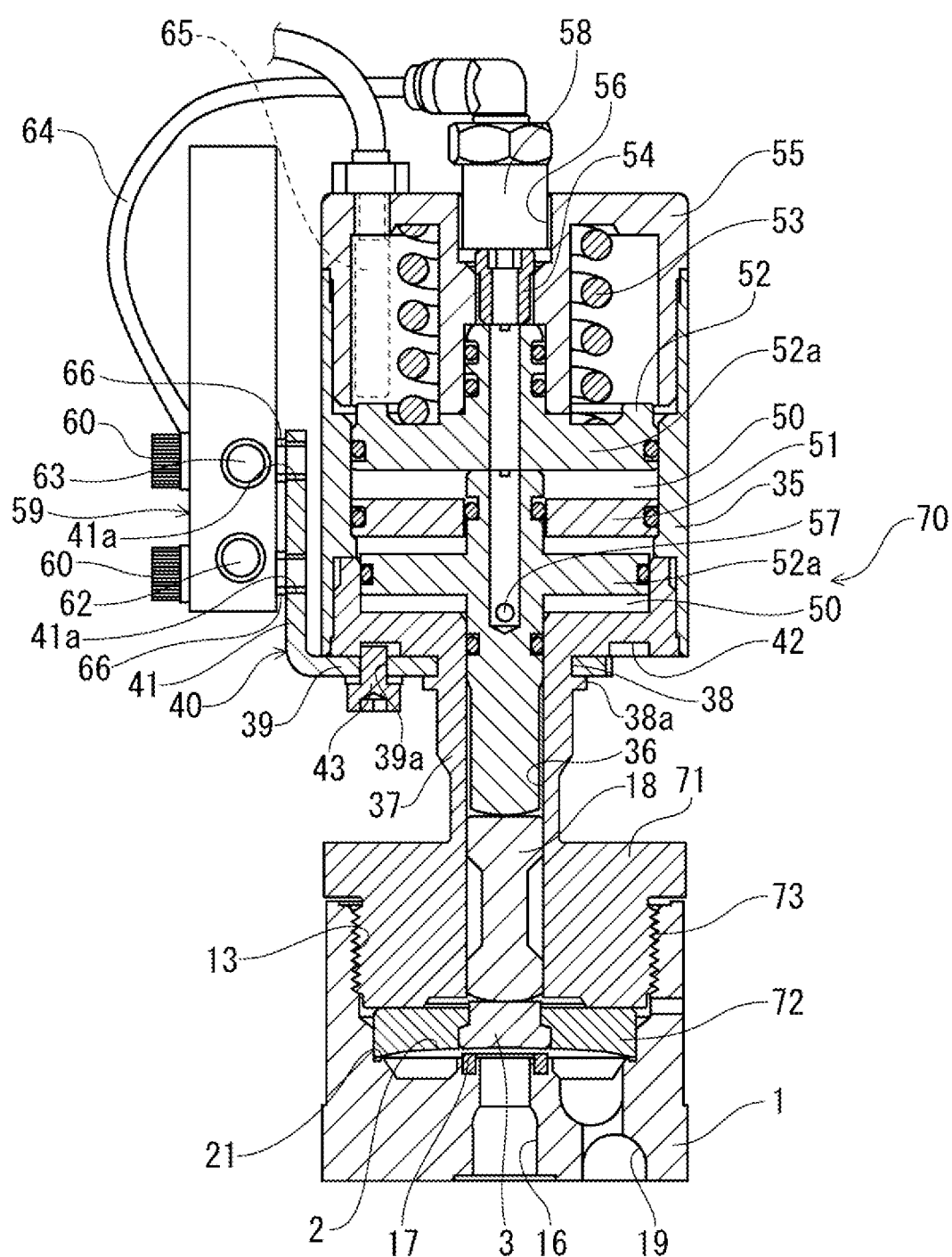
FIG. 7 is a sectional view of a conventional example of a diaphragm valve with an actuator attached thereto.

On the other hand, FIG. 7 is a longitudinal sectional view in which a base body 71 in a conventional structure of an actuator main body 70 is attached to the body 1 of a diaphragm valve common to the present example. In FIG. 7, the structure of each of the body 1 (valve seat 17), the diaphragm 2 (outer seal part 20), a bonnet 72, and the diaphragm piece 3 is similar to that of the above-described present example. However, this conventional structure of FIG. 7 is not supported by jigs for assembling for use in the assembling method of the present invention. Therefore, no fixing hole part is provided to the bonnet 72, and no fastening nut 5 is provided. A male screw part 73 is provided to the base body 71, and this male screw part 73 is directly screwed to the female screw part 13 provided to the opening 10 of the body 1. This structure is typical as a structure of an outer seal part of a conventional valve of this type.

In the conventional structure depicted in FIG. 7, when the male screw part 73 of the base body 71 is screwed to the female screw part 13, the lower end face of the base body 71 is rotated to fasten the upper surface of the bonnet 72 to tightly attach the outer periphery of the diaphragm 2 to the convex part 21, thereby configuring the outer seal part 20. Therefore, if the upper surface of the bonnet 72 co-rotates with the lower end face of the base body 71 when the outer seal part 20 is configured, the lower surface of the outer periphery of the bonnet 72 adhered to the upper surface of the outer periphery of the diaphragm 2 rotates, thereby possibly causing a twist of the diaphragm 2. In particular, when severe use conditions are required, this twist may cause an adverse effect not negligible even if it is slight. In principle, the conventional structure of FIG. 7 cannot completely eliminate the possibility of occurrence of this adverse effect.

By contrast, by using the above-described diaphragm valve assembling method according to the present invention, the possibly of occurrence of this twist of the diaphragm can be eliminated at least at the time of valve assembling. Thus, intrinsic characteristics of the diaphragm based on the tightly-attached state of the outer seal part (valve structure), such as flexibility capability and a rate of deformation, are not impaired. Therefore, the missing effect in the conventional structure can be appropriately maintained. Thus, for example, it can be expected to improve an opening/closing durability count and valve-seat sealability and to stabilize the valve opening/closing speed. Also, variations in the Cv value among valves can be reduced. Furthermore, it can also be expected to improve reduction in damage and sealing performance of the outer seal part. It goes without saying that these effects are not limited to be applied to valves for ALD but can be expected widely and generally for diaphragm values.

Also, as depicted in FIG. 6, the male screw part 32 of the base body 31 and the female screw part 24 of the fastening nut 5 can be attached and detached by screwing in the present example. Therefore, only with the base body 31 in the above-described structure on a member to be attached to the upper part of the body 1, the actuator can be attached and detached irrespectively of the structure of the member to be attached. Thus, any actuator including the base body 31 having at least the male screw part 32 can be attached and detached as appropriate and as required. Therefore, for example, even if the actuator is damaged due to some reason, only the actuator can be easily and quickly replaced, with the valve body part being kept, that is, with the state of the outer seal part 20 being kept, in which the bonnet 4 and the convex part 21 are tightly attached to and hold the outer periphery 2a of the diaphragm 2. Alternatively, with the valve body part being kept similarly, a change to an actuator of another type can be made, for example, a mutual change between a NC (normal close) valve and a NO (normal open) valve.

According to the conventional example depicted in FIG. 7, the diaphragm 2 may become cracked with an opening/closing count on the order of 5,000,000. In the present example depicted in FIG. 6, it has been demonstrated that no crack occurs in the diaphragm 2 even if the opening/closing count exceeds 20,000,000.

Finally, in FIG. 6 and FIG. 7, the structure of portions other than the lower part of the base body 31 in the actuator main body 33 is described. The structure of these portions including the upper part of the base body 71 is common between FIG. 6 and FIG. 7. The actuator main body 33 is provided with at least two air chambers 50 to ensure an air drive force (valve-opening force). As depicted in FIG. 6 and FIG. 7, a sub-base 51 is arranged, and a piston 52 is configured in two stages in a compact manner to ensure the air chambers 50. Also, in the actuator main body 33, a spring 53 to cause the stem to descend and the piston 52 to be caused to ascend by supply of compressed air to the air chambers 50 are incorporated, and the amount of ascent of this piston 52 is adjustable by screwing an adjustment screw 54, thereby providing stroke adjusting means.

In FIG. 6 and FIG. 7, a cylinder 55 has a substantially cylindrical outer appearance, is provided with a connecting part 56 at its axial center position, and is further formed on its depth side with a female screw part that can be screwed to a male screw part of the adjustment screw 54 and is formed on its further depth side with a cylindrical fit-in part that can be fit to an upper part of the piston 52. At a lower end of the cylinder 55, a male screw that can be screwed to the female screw of the casing 35 is provided. Also, inside the cylinder 55, a receiving part for biasing the spring 53 is provided to be recessed, as will be described further below.

In FIG. 6 and FIG. 7, the casing 35 is formed to have a cylindrical outer appearance having a diameter substantially equal to that of the cylinder 55, and has the above-described female screw formed at an upper end and also has the female screw formed at the lower end, which can be screwed to the male screw at the upper end of the base body 31. Also, on the inner circumferential surface of the casing 35, a step part which can engage and hold the sub-base 51 is formed.

In FIG. 6 and FIG. 7, the piston 52 has two circular-flange-shaped piston parts 52a extending in parallel and a cylindrical extending part which links the center positions of these piston parts 52a. On an upper end face side of the extending part, a flow path is open which can conduct supplied air inside the piston 52 to the axial center direction. In this flow path, a flow path 57 that is open toward the two air chambers 50 and can supply air thereto is formed as being branched. Thus, when an air supply source is connected to the connecting part 56 via a coupling 58 or the like, air from the supply source is conducted through the flow path 57 to be supplied to the air chambers 50. The piston part 52a is provided on the outer edge a FKM-made O ring to seal and slide between the inner circumferential surfaces of the casing 35 and the base body 31. Similarly, O rings are also provided at a plurality of locations of the extending part in the axial center direction of the piston 52. Furthermore, an O ring is provided also on an outer circumferential edge part of the sub-base 51.

In FIG. 6 and FIG. 7, the rod 18 as a stem is provided so as to be able to slide as fitting in the inner circumferential surface of the attachment hole 36 of the base body 31 almost without resistance, is made of SUS 304 and formed to be vertically elongated. The rod 18 has an upper end face in contact with the lower end face of the piston 52 and a lower end face in contact with the upper end face of the diaphragm piece 3.

Also, when the fluid is at high temperatures such as approximately 200 degrees Celsius and this heat transmission increases the temperature of the actuator, operation failure may occur. When an electronic device such as a sensor is attached, a trouble may occur, for example, the device is out of order due to heat. To make heat from the heated body 1 and so forth difficult to be transmitted to the actuator main body 33, predetermined measures against heat are taken. In the present example, the cross-sectional area of a heat conduction route member through which heat is transmitted from the body 1, the bonnet 4, and so forth as heating members to the actuator main body 33 is decreased within a range not causing a trouble in the functions of the valve and the actuator.

Specifically, to decrease a contact region in contact with the upper end face of the diaphragm piece 3 that can serve as a heating member due to heat conduction from the fluid at high temperatures, the lower end face of the rod 18 is formed in an arc-shaped curved shape and, similarly, at least the lower end face of the piston 52 (or the upper end face of the rod 18) is formed in an arc-shaped curved shape, thereby decreasing the contact region of the rod 18 that can serve as a heating member in contact with the lower end face of the piston 52. This eliminates efficient heat conduction due to a surface contact at least above and below the rod 18. Furthermore, a constricted part is provided to the axial attachment part 37 of the base body 31, and a constricted part is also provided to the rod 18. With these constricted parts, the cross-sectional area of heat conduction from the body 1 side to the actuator main body 33 side is decreased as much as possible to reduce thermal conductivity.

In FIG. 6 and FIG. 7, the attachment member 40 is a member having an L-shaped cross section formed of the disc-shaped attachment part 39 with an insertion groove and a side surface part 41. A bottom surface side of the attachment member 40 is the attachment part 39 formed in a thin disc shape. Although not depicted, the insertion groove is formed in a notched shape at the axial center position to have a substantially U shape. This insertion groove can be rotatably fitted and fixed to the holding part 38 of the base body 31 as appropriate. Also, the hole part 39a where the bolt 43 with a hexagonal hole can be fitted and screwed is formed at one location at the axial center position. A plurality of hole parts 39a may be formed in accordance with implementation. For example, three hole parts 39a in total may be provided at symmetrical locations.

In FIG. 6 and FIG. 7, the side surface part 41 of the attachment member 40 is formed in a thin rectangular plate shape, and is provided with two hole parts 41a where two bolts 60 capable of being inserted into a solenoid valve 59 for fixing can be inserted. This hole part 41a is provided as appropriate also in accordance with implementation. The side surface part 41 of the present example is connected to the attachment part 39 in a substantially right angle direction. FIG. 6 is a longitudinal sectional view with this attachment member 40 attached to the actuator main body 33. As depicted in FIG. 6, since the attachment member of the present example has a substantially L-shaped cross section, even if the attachment structure of the present example is attached to the actuator, the solenoid valve 59 can be integrated in an extremely close state almost without an extra space at a position on a side surface of the actuator main body 33.

In FIG. 6 and FIG. 7, the solenoid valve 59 is not particularly restrictive. In the present example, the solenoid valve 59 is for operating a pneumatic actuator, although not limited thereto. The solenoid valve 1 has a compact form fitting in a substantially rectangular plate shape as a whole, and is interposed as being connected between an air supply source side (air cylinder) not depicted and the actuator main body 33 via air plumbing. The solenoid valve 1 has a function of controlling supply (or exhaust) of compressed air to the actuator main body 33 by energization which causes an inner solenoid valve not depicted to operate to switch open/close of a flow path of the air plumbing as appropriate under predetermined control by control means such as a speed controller.

In FIG. 6 and FIG. 7, on a side surface of the solenoid calve 59, an input port 62 and a discharge port 63 to be connected to an air supply source side not depicted are open. On an opposite side surface via the inside of a main body of the solenoid valve 59 where air flow passage switching is performed, an output port not depicted is open. To this output port, one end of a supply line 64 (resin-made transparent tube) is connected via a coupling not depicted. The other end of this supply line 64 is connected via a minimum-required distance to a coupling 58. This coupling 58 is coupled to a connecting part 56 that is open to an upper surface side of the actuator main body 33, allowing compressed air to be supplied (or exhausted) as appropriate to the air chambers 50 inside the actuator main body 33.

In FIG. 6 and FIG. 7, if the coupling 58 is a universal joint (elbow) which can freely rotate about the axial center of the actuator main body 33 as being connected thereto, the attachment member 40 can freely rotate about the actuator main body 33 with the solenoid valve 59 attached thereto. Therefore, the combination of these suitably allows the attachment position of the solenoid valve 59 to be adjusted to any position on the side surface without being limited by the direction of the coupling 58. Furthermore, for example, if an end of the supply line 64 can be connected with a single touch and connection can be released by pressing an open ring, handleability and usability of the attachment structure of the present invention are further suitably enhanced.

Also, to the upper surface side of the actuator main body 33, a proximity sensor 65 that can sense opening/closing of the valve is connected. A lower end of the sensor 65 is provided so as to be able to in proximity to the upper surface of the piston 52, and an approach allows the sensor 65 to sense vertical motions of the piston 52 (opening/closing operation of the valve). With this, data usable for controlling devices such as the actuator main body 33 and the valve can be acquired.

Furthermore, when the solenoid valve 59 is bolted to the side surface part 41, a washer 66 is interposed between the side surface part 41 and the solenoid valve 59. As the washer 66, two flat washers made of stainless steel are stacked for use per bolt 60, and two bolts 60 are used to attach the solenoid valve 59 to the side surface part 41. Alternatively, for example, a resin-made washer may be used, and any washer can be selected in accordance with implementation.

Between the two bolts 60 and the side surface of the solenoid valve 59, one spring washer is interposed.

Furthermore, the present invention is not limited to the description of the above-described embodiment, and can be variously modified in a range not deviating from the gist of the present invention described in the claims of the present invention.

What is claimed is:

1. A set of jigs for assembling a valve, comprising:
   an above fixing jig;
   a below fixing jig;
   a rotation-stop jig; and
   a fixing means,
   wherein the rotation-stop jig is inserted into and fixed to the above fixing jig in a non-rotational state, and
   wherein the fixing means non-rotatably and attachably fixes the rotation-stop jig to a bonnet of the valve, and a body of the valve is non-rotationally fixed to the below fixing jig, such that the bonnet and the body are fixed independently of each other in a non-rotational state so as to prevent relative rotation between the bonnet and the body, thereby preventing an outer periphery of a diaphragm from twisting in which a lower surface of an outer periphery of the bonnet and an outer seal part of the body are tightly attached to and hold the outer periphery of the diaphragm.

2. The set of jigs for assembling a valve according to claim 1, further comprising a fastening nut which is screwed to an opening of the body, wherein the outer seal part is configured by screwing of the fastening nut with a tool.

3. The set of jigs for assembling a valve according to claim 1, wherein the fixing means is configured by a plurality of pins to be commonly inserted into the bonnet and the rotation-stop jig.

4. The set of jigs for assembling a valve according to claim 1, wherein the valve is a diaphragm valve.

* * * * *